United States Patent
Conner (10) Patent No.: US 7,593,497 B2
(45) Date of Patent: Sep. 22, 2009

(54) METHOD AND APPARATUS FOR ADJUSTMENT OF SYNCHRONOUS CLOCK SIGNALS

(75) Inventor: George W. Conner, Camarillo, CA (US)

(73) Assignee: Teradyne, Inc., North Reading, MA (US)

( * ) Notice: Subject to any disclaimer, the term of this patent is extended or adjusted under 35 U.S.C. 154(b) by 673 days.

(21) Appl. No.: 11/263,397

(22) Filed: Oct. 31, 2005

(65) Prior Publication Data

US 2007/0098127 A1    May 3, 2007

(51) Int. Cl.
*H04L 7/04* (2006.01)
(52) U.S. Cl. .................................. 375/362
(58) Field of Classification Search ............ 375/215, 375/294, 327, 354, 355, 359, 362, 364, 366, 375/371, 373, 374, 375, 376; 342/103; 370/503; 455/180.3, 266
See application file for complete search history.

(56) References Cited

U.S. PATENT DOCUMENTS

| | | | |
|---|---|---|---|
| 3,363,183 A | 1/1968 | Bowling et al. ............... 328/63 |
| 3,471,790 A | 10/1969 | Kaps .......................... 328/63 |
| 3,612,906 A | 10/1971 | Kennedy ..................... 307/269 |
| 3,947,697 A | 3/1976 | Archer et al. ............... 307/208 |
| 4,119,910 A | 10/1978 | Hayashi ....................... 324/83 |
| 4,488,108 A | 12/1984 | Treise et al. ............. 324/83 D |
| 4,686,458 A | 8/1987 | Beyerbach et al. ........ 324/83 D |
| 5,003,194 A | 3/1991 | Engelhard ................... 307/265 |
| 5,084,669 A | 1/1992 | Dent ......................... 324/83 D |
| 5,258,968 A | 11/1993 | Matsuda et al. ........... 369/44.35 |
| 5,293,079 A | 3/1994 | Knoch ........................ 307/234 |
| 5,321,700 A | 6/1994 | Brown et al. ................. 371/27 |
| 5,381,100 A | 1/1995 | Hayashi ..................... 324/601 |
| 5,568,071 A | 10/1996 | Hoshino et al. ............... 377/43 |
| 6,233,528 B1 | 5/2001 | Lai et al. ...................... 702/69 |
| 6,291,981 B1 | 9/2001 | Sartschev ................. 324/76.82 |
| 6,437,589 B1 | 8/2002 | Sugano ........................ 324/763 |
| 6,735,543 B2 | 5/2004 | Douskey et al. ............. 702/120 |
| 6,864,715 B1 | 3/2005 | Bauer et al. |
| 2003/0002608 A1 | 1/2003 | Glenn et al. |
| 2005/0008112 A1 | 1/2005 | Takeo et al. |
| 2005/0213696 A1* | 9/2005 | Totsuka et al. ............... 375/376 |

(Continued)

FOREIGN PATENT DOCUMENTS

GB    2 242 085 A    9/1991

(Continued)

OTHER PUBLICATIONS

Dallas Semiconductor Maxim A/D and D/A Conversion/Sampling Circuits High-Speed Signal Processing, "Design a Low-Jitter Clock for High-Speed Data Converters", Nov. 20, 2001, 15 pgs.

(Continued)

*Primary Examiner*—Sam K Ahn
(74) *Attorney, Agent, or Firm*—Foley & Lardner LLP; Joseph M. Maraia; Ralph Trementozzi (57) ABSTRACT

A synchronous clock signal can be adjusted relative to a data signal by decreasing a delay in the synchronous clock signal if a transition of a data signal occurs before a pulse of an offset clock signal which is delayed by one half cycle relative to the synchronous clock signal. The synchronous clock signal can be delayed if the transition of the data signal occurs after the pulse of the offset synchronous clock signal.

12 Claims, 7 Drawing Sheets

U.S. PATENT DOCUMENTS

2006/0045225 A1* 3/2006 Chou .................... 375/355

FOREIGN PATENT DOCUMENTS

WO     WO 2004/040768 A1    10/2002

OTHER PUBLICATIONS

Silicon Image, D&R Industry Articles, www.design-reuse.com, Oct. 5, 2005, 3 pgs.

PCT International Search Report (PCT/US2006/041744); Date of Mailing Apr. 27, 2007; pp. 1-4.

* cited by examiner

METHOD AND APPARATUS FOR ADJUSTMENT OF SYNCHRONOUS CLOCK SIGNALS

FIELD OF THE INVENTION

The present invention relates to adjustment of timing signals.

BACKGROUND

Information carried in data signals can be lost if clock signals that are associated with the data signals are not properly timed relative to the data signals. Certain equipment such as electronic test equipment can provide synchronous clock signals that can be aligned with data signals of a device such as a device under test. Since these synchronous clock signals are provided by equipment external to the device, sometimes the clock signals can be misaligned with the data signals provided by the device. Misalignment of synchronous clock signals can become particularly problematic when very high speed data signals and clock signals are being used.

Another arrangement is having certain equipment receive source-synchronous clock signals along with data signals from the device. Source-synchronous clock signals generally may not become misaligned with the data signals that are associated with them. However, communicating source-synchronous clock signals to each of a plurality of channels on certain equipment where the clock signals may be needed for comparison with associated data signals can be inefficient and burdensome.

SUMMARY OF THE INVENTION

Illustrative embodiments of the present invention provide a method and apparatus for aligning a synchronous clock signal with a data signal which comes from a different source than the synchronous clock signal. Embodiments of the present invention can be used, for example, in equipment such as test equipment to generate well timed synchronous clock signals internally for association with data signals that are received from an external source.

An illustrative embodiment of the invention provides a method for calibrating a synchronous clock signal by advancing the synchronous clock signal, by decreasing a delay in the synchronous clock signal, for example, if a transition of a data signal occurs before a pulse of an offset synchronous clock signal. The offset synchronous clock signal is delayed by one half cycle relative to the synchronous clock signal. In the illustrative embodiment, the delay in the synchronous clock signal can be increased if the transition of the data signal occurs after the pulse of the offset synchronous clock signal.

Another illustrative embodiment of the invention provides a method for providing a synchronous clock signal. In this illustrative embodiment, the synchronous clock signal can be offset by a half cycle to provide an offset clock signal. A data signal can be latched with a pulse of the synchronous clock signal to provide a first state. The data signal can be latched with another pulse, such as a next pulse of the synchronous clock signal, for example to provide a second state. The data signal can be latched with a pulse of the offset clock signal to provide a third data state. A delay in the synchronous clock signal can be decreased if the first state is different from the second state and the first state is equal to the third state. A delay in the synchronous clock signal can be increased if the first state is different from the second state and the first state is different from the third state.

Another illustrative embodiment of the invention provides an apparatus for providing a synchronous clock signal. The illustrative apparatus includes latching circuitry which receives a data signal, a synchronous clock signal and an offset synchronous clock signal. The illustrative apparatus further includes compare circuitry in communication with the latching circuitry. The compare circuitry receives a latched data state corresponding to a first state, another latched data state, such as a previous latched data state, for example, corresponding to a second state and an offset latched data state corresponding to a third state from the latching circuitry. The illustrative apparatus further includes controllable delay circuitry in communication with the compare circuitry. The controllable delay circuitry receives the synchronous clock signal and changes the delay in the synchronous clock signal depending on whether the second state is equal to or different from the third state if the first state is different from the second data state. In a particular embodiment, the controllable delay circuitry may change the delay in the synchronous clock signal depending on whether the third state is equal to or different from the first state if the first state is different from the second state.

BRIEF DESCRIPTION OF THE DRAWINGS

The present invention will be more fully understood from the following detailed description of illustrative embodiments taken in conjunction with the accompanying drawings in which.

DETAILED DESCRIPTION

Figure 1:
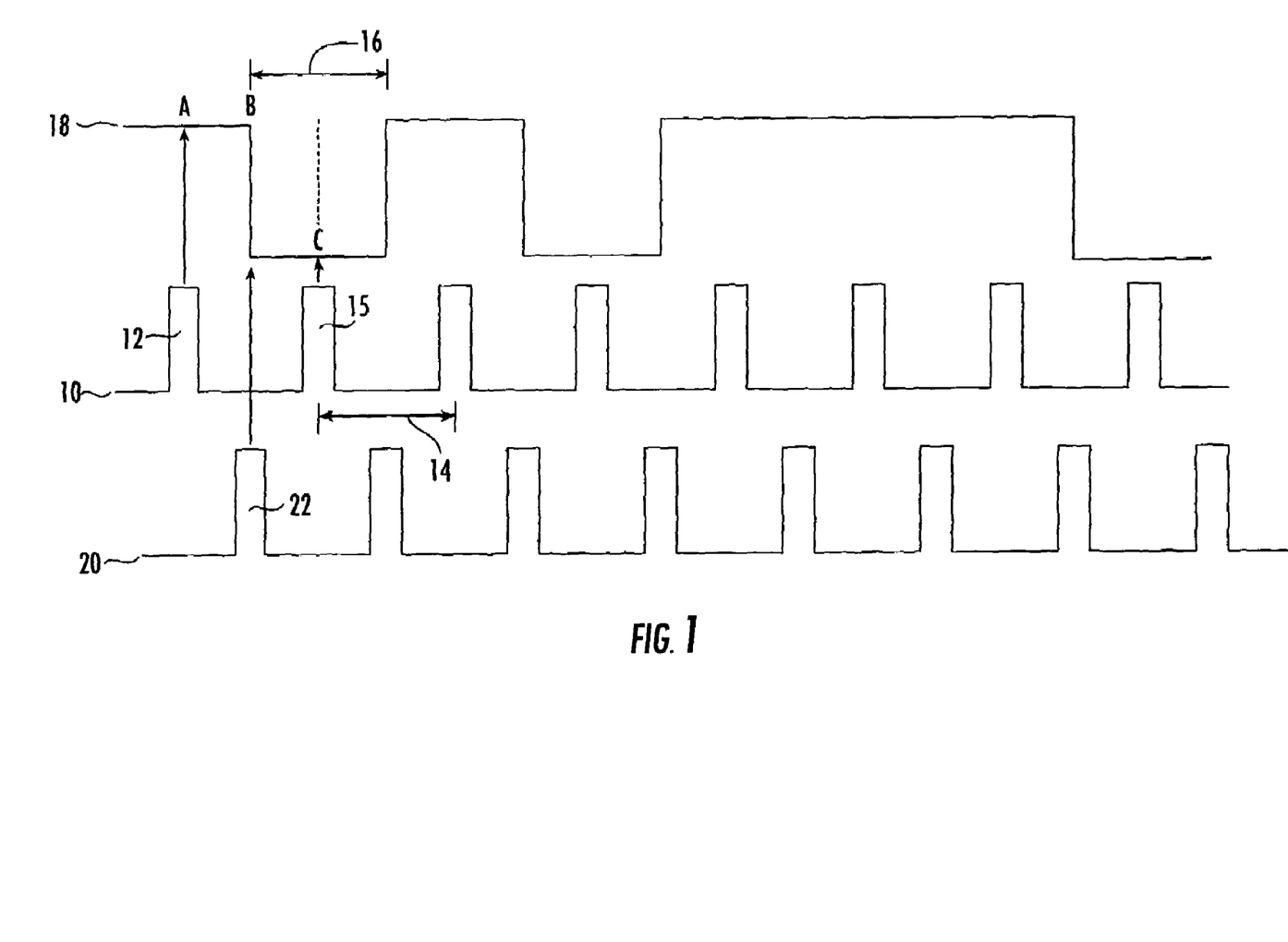
FIGS. 1-3 are timing diagrams of a data signal, a synchronous clock signal and an offset clock signal according to illustrative embodiments of the present invention.

Illustrative embodiments of the present invention are described with reference to data signals, synchronous clock signals and offset clock signals. Timing diagrams showing the relative timing of a data signal, a synchronous clock signal and offset clock signal are presented in FIGS. 1-3. Referring to FIG. 1, a synchronous clock signal 10 includes a train of synchronous clock pulses 12 that can have a period 14 corresponding to a data cycle 16 of a data signal 18. An offset clock signal 20 includes a train of offset clock pulses 22 that have the same period 14 as the synchronous clock signal but are offset from the synchronous clock pulses 12 by one half period (e.g., one half of data cycle 16). The signals shown in FIG. 1 represent ideal timing wherein the synchronous clock pulses 12 should occur at the center of each data cycle 16 (e.g., at time A). In the ideal representation shown in FIG. 1, any transition of the data signal 18 should occur simultaneously with an offset clock pulse 22 (e.g., at time B).

Figure 2:
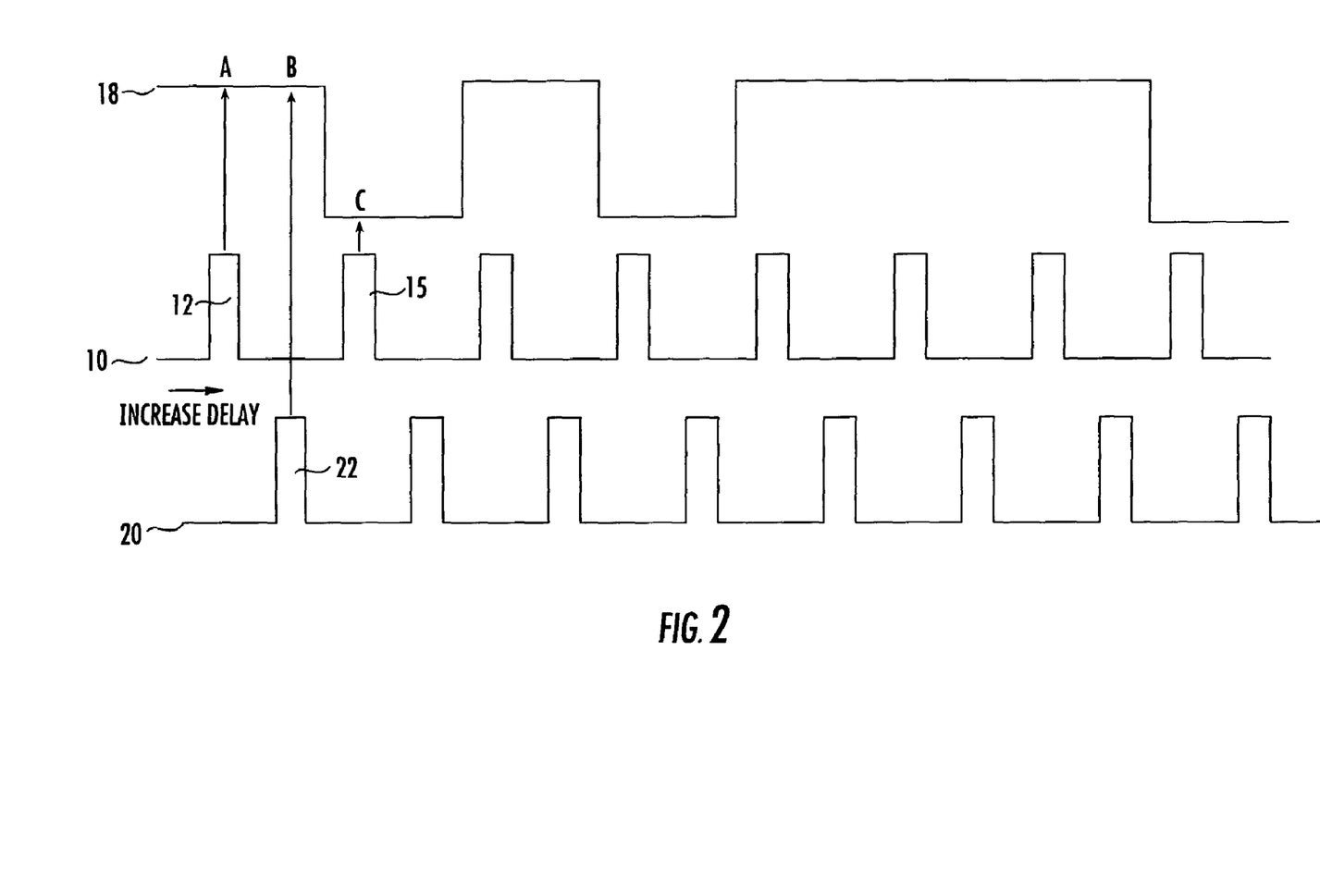

FIG. 2 is a timing diagram illustrating the relationship between a data signal, synchronous clock signal and offset clock signal in a system wherein the synchronous clock pulses 12 do not occur at the center of each data cycle. Rather, synchronous clock pulses 12 in FIG. 2 occur earlier than the center of each data cycle. In this case of a synchronous clock signal 10 which runs early, the offset clock signal 20 runs early and the offset pulse 22 does not occur simultaneously with a transition of the data signal 18. In an illustrative embodiment of the invention, if a transition occurred in the data signal 18, an early synchronous clock signal can be identified by determining that a state of the data signal 18 at the time of an offset clock pulse 22 is the same as the state of the data signal at the time of the previous synchronous clock pulse 12.

Figure 3:
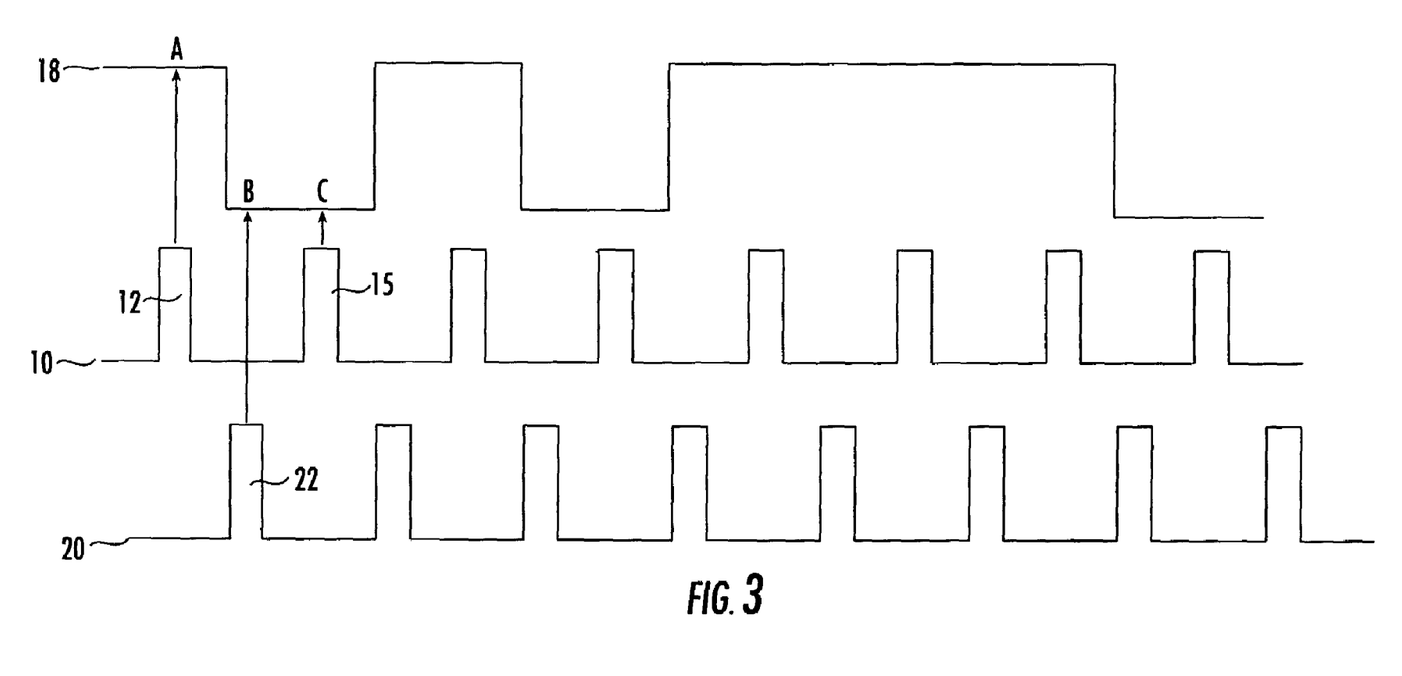

FIG. 3 is a timing diagram illustrating the relationship between a data signal, synchronous clock signal and offset clock signal in another system wherein the synchronous clock pulses 12 do not occur at the center of each data cycle. Rather, synchronous clock pulses 12 in FIG. 3, occur later than the center of each data cycle. In this case of a synchronous clock signal 10 which runs late, the offset clock signal 20 runs late and the offset pulse 22 does not occur simultaneously with a transition of the data signal 18. In an illustrative embodiment of the invention, a late synchronous clock signal can be identified if a transition occurred in the data signal 18 by determining that a state of the data signal 18 at the time of an offset clock pulse 22 is the different from the state of the data signal at the time of the previous synchronous clock pulse 12.

Figure 4:
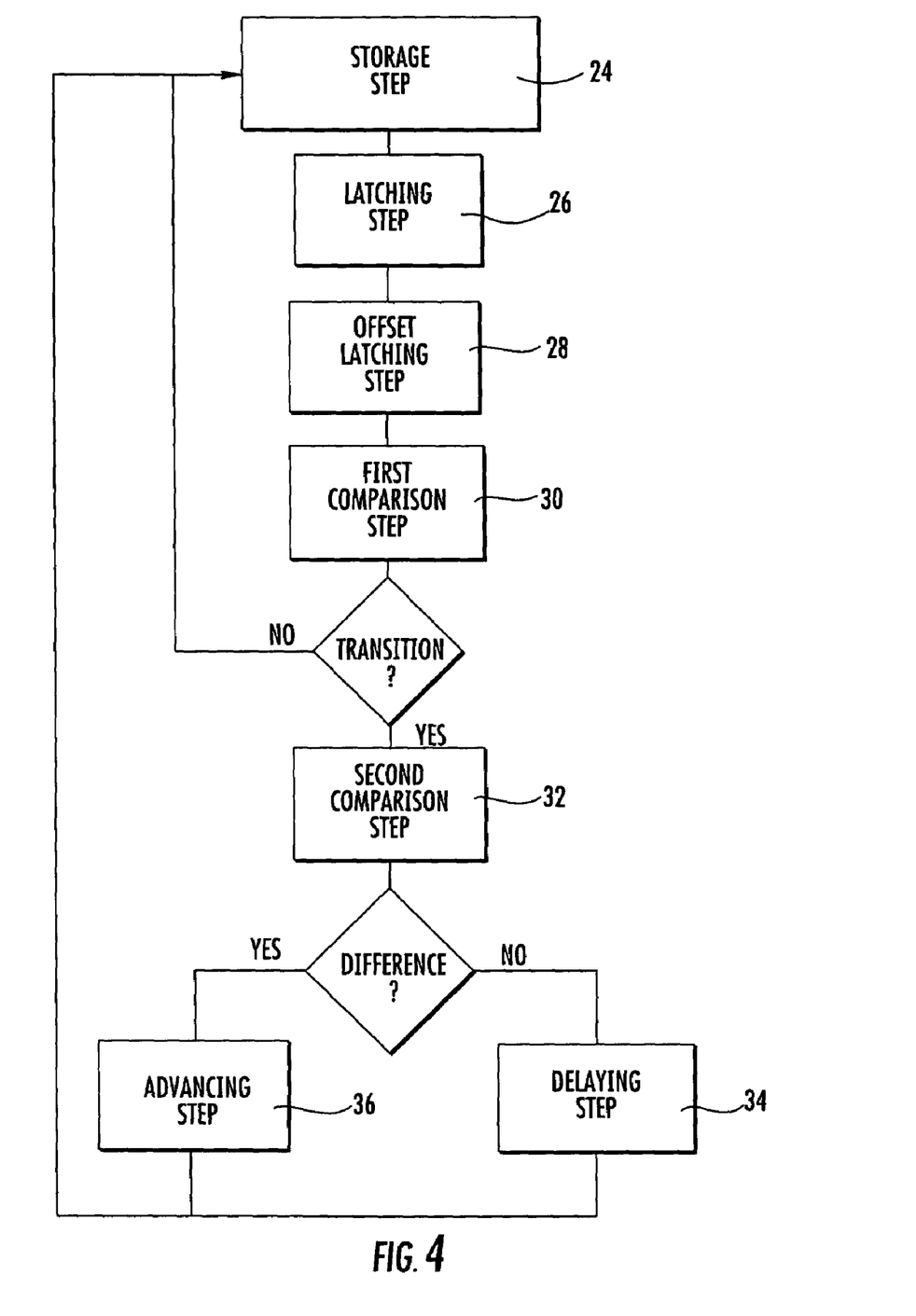
FIG. 4 is a process flow diagram of a method for adjusting the timing of a synchronous clock signal according to an illustrative embodiment of the present invention.

A method for adjusting the timing of a synchronous clock signal relative to a data signal according to an illustrative embodiment of the invention is described with reference to FIG. 4. In a storage step 24, a state of a data signal 18 at the time of a first synchronous clock pulse 12 is stored. In a latching step 26, a state of the data signal 18 is stored at the time of a second synchronous clock pulse 15. It should be understood that the terms "first," "second" and "third," etc. used herein are not used to identify an initial, second and third pulse or state in a signal, but rather are used to identify pulses or states anywhere in a signal or signals relative to each other. In an offset latching step 28, a state of the data signal 18 is stored at the time of an offset clock pulse 22 that occurs between the first synchronous clock pulse 12 and the second synchronous clock pulse 15.

In the illustrative embodiment, a first comparison step 30 can be performed to determine whether a transition of the data signal 18 has occurred between the first synchronous clock pulse 12 and the second synchronous clock pulse 15. In the first comparison step 30, a state of the data signal 18 at the time of the first synchronous clock pulse 12 that had been stored in the storage step 24 can be compared with a state of the data signal 18 at the time of the second synchronous clock pulse 15 that had been stored in the latching step 26. If these states are different, then a transition has occurred and a second comparison step 32 can be performed to determine whether the synchronous clock signal 10 is running early or late. If these states are the same, then no transition has occurred. If no transition has occurred, the state of the data signal 18 at the time of the second synchronous clock pulse 15 can be stored in a storage step 24 for a next iteration of the method of this illustrative embodiment.

In the second comparison step 32, the state of the data signal 18 at the time of the first synchronous clock pulse 12 that had been stored in the storage step 24 can be compared with the state of the data signal 18 at the time of the offset clock pulse 22 that had been stored in the offset latching step 28. If the states compared in the second comparison step 32 are the same, then the synchronous clock signal 10 is running early so a delaying step 34 can be performed to more closely align pulses of the synchronous clock signal 10 with the center of cycles of the data signal 18. If the states compared in the second comparison step 32 are different, then the synchronous clock signal 10 is running late so an advancing step 36 can be performed to more closely align pulses of the synchronous clock signal 10 with the center of cycles of the data signal 18. In either case, the state of the data signal 18 at the time of the second synchronous clock pulse 15 can then be stored in a storage step for use in a next iteration of the method of this illustrative embodiment.

Figure 5:
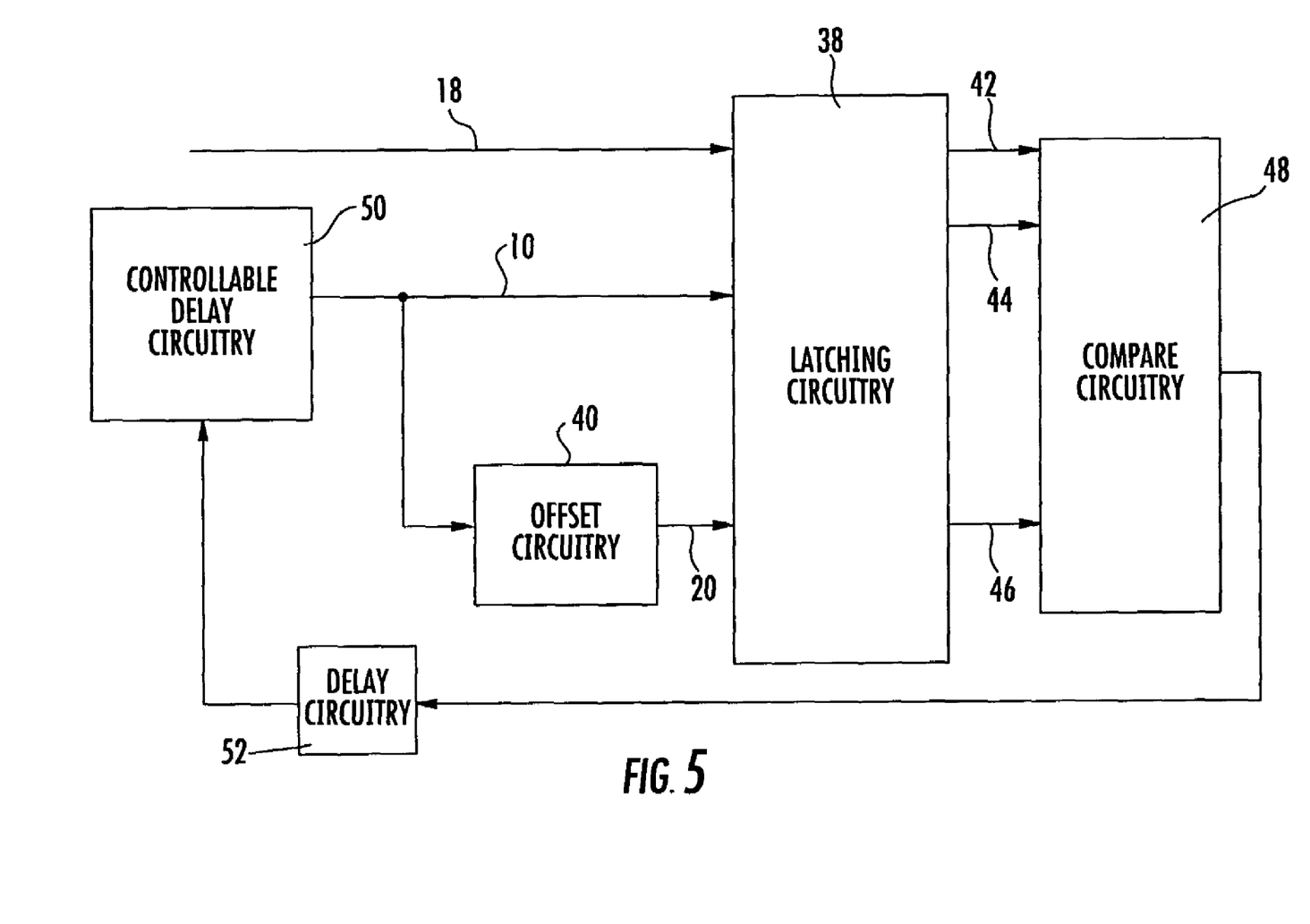
FIG. 5 is a schematic block diagram of an apparatus for providing a synchronous clock signal according to an illustrative embodiment of the present invention.

An apparatus for adjusting the timing of a synchronous clock signal relative to a data signal according to an illustrative embodiment of the invention is described with reference to FIG. 5. A data signal 18, a synchronous clock signal 10 and an offset clock signal 20 are provided to latching circuitry 38. In the illustrative embodiment, the synchronous clock signal 10 is also provided to offset circuitry 40 which provides the offset clock signal 20. The latching circuitry 38 stores states of the data signal 18 at the time of each pulse of the synchronous clock signal 10 and offset clock signal 20. In the illustrative embodiment, the latching circuitry 38 is in communication with compare circuitry 48 and provides to the compare circuitry 48: a first state 42 of the data signal 18 that had been stored at the time of a first synchronous clock pulse (item 12, FIGS. 1-3); a second state 44 of the data signal 18 that had been stored at the time of a second synchronous clock pulse (item 15, FIGS. 1-3); and a third state 46 of the data signal 18 that had been stored at the time of an offset clock pulse (item 22, FIGS. 1-3) which occurred between the first synchronous clock pulse (item 12, FIGS. 1-3) and the second synchronous clock pulse (item 15, FIGS. 1-3).

In the illustrative embodiment, the compare circuitry 48 is in communication with controllable delay circuitry 50. The compare circuitry 48 sends an advance signal (i.e., a decrease delay signal) to the controllable delay circuitry 50 if the first state 42 is different from the second state 44 and the first state 42 is different from the third state 46. The compare circuitry 48 sends a retard signal (i.e., an increase delay signal) to the controllable delay circuitry 50 if the first state 42 is different from the second state 44 and the first state 42 is the same as the third state 46. In the illustrative embodiment, delay circuitry 52 is provided between the compare circuitry 48 and the controllable delay circuitry 50 to delay the advance and retard signals long enough for signals in the apparatus to settle following previous advance and retard signals.

Figure 6:
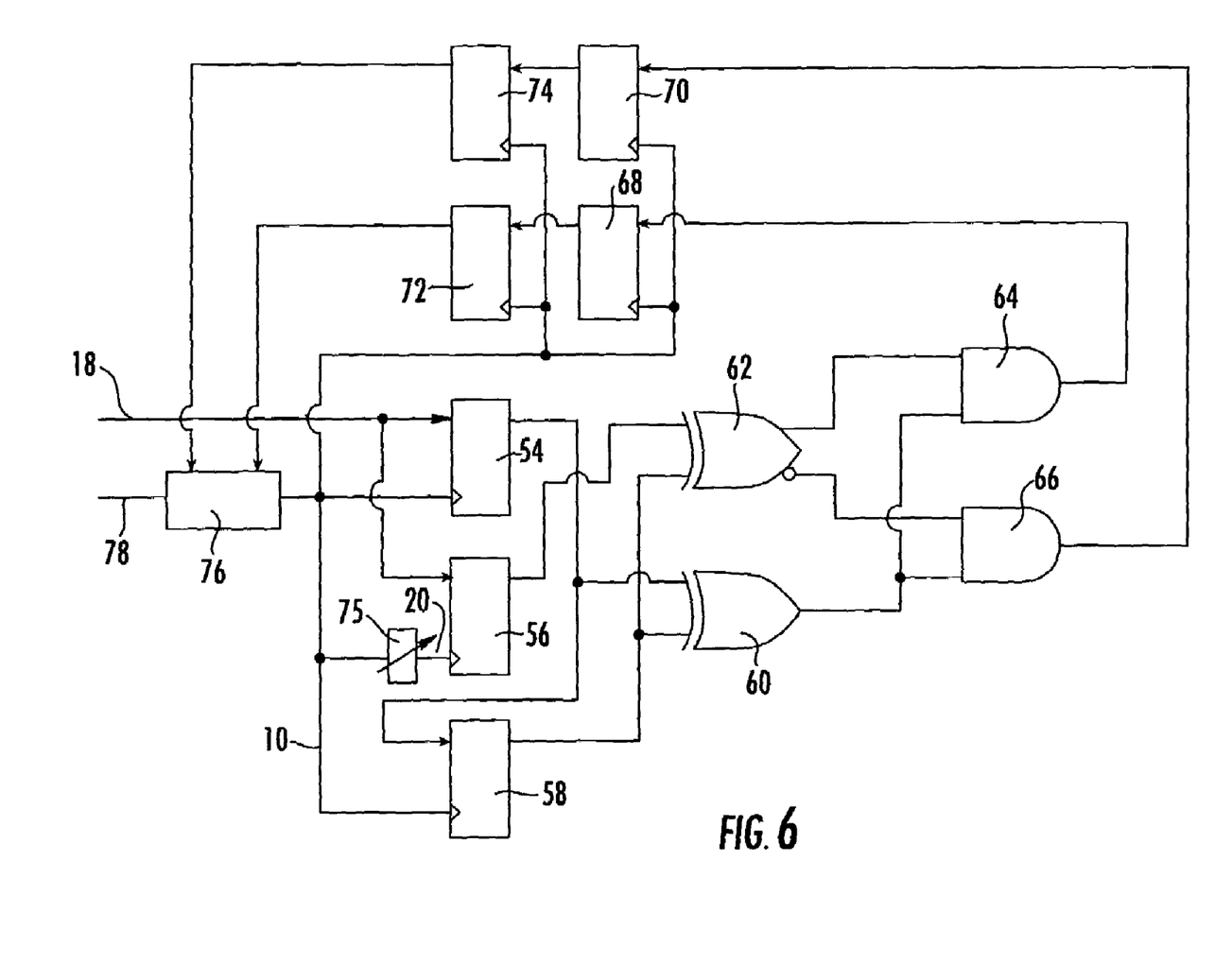
FIG. 6 is a schematic circuit diagram of an apparatus for providing a synchronous clock signal according to an illustrative embodiment of the present invention.

An apparatus for adjusting the timing of a synchronous clock signal relative to a data signal according to an illustrative embodiment of the invention is described in more detail with reference to FIG. 6. A data signal 18 is provided to data inputs of a first latch 54 and a second latch 56. A synchronous clock signal 10 is provided to clock inputs of the first latch 54, a third latch 58, a fourth latch 68, a fifth latch 70, a sixth latch 72 and a seventh latch 74. The synchronous clock signal 10 is also provided to offset circuitry 75 which offsets the synchronous clock signal 10 by half of a cycle to provide an offset synchronous clock signal 20 to the clock input of the second latch 56. The output of the first latch 54 is provided as input of the third latch 58 so that the third latch 58 stores the state that had been stored in the first latch 54 on the previous cycle of the synchronous clock signal 10.

The output of the third latch 58 provides a first state to one input of a first exclusive-OR-gate 60 (hereinafter referred to as "XOR gate") and to one input of a second XOR gate 62. The second latch 56 provides a third state to the other input of the second XOR gate 62. The first latch 54 provides a second state to the other input of the first XOR gate 60.

The output of the first XOR gate 60 is asserted if the first state is different from the second state, i.e., if a data signal transition occurred between the first synchronous clock pulse 12 and the second synchronous clock pulse 15 (FIGS. 1-3). Accordingly, in this illustrative embodiment, the first XOR gate 60 provides a transition indicator signal. The output of the first XOR gate 60 is provided to one input of a first AND gate 64 and to one input of a second AND gate 66.

The second XOR gate 62 has a non-inverted output which is asserted if the first state is different from the third state, and an inverted output which is asserted if the first state is the same as the third state. Persons having ordinary skill in the art should understand that an XOR gate such as the second XOR gate 62 having an inverted output and a non-inverted output can be constructed by providing a connection to both sides of an inverter that is connected to the output of a standard single output XOR gate.

In the illustrative embodiment, the non-inverted output of the second XOR gate 62 is provided as an input to the first AND gate 64. In the illustrative embodiment, the inverted output of the second XOR gate 62 is provided as an input to the second AND gate 66. Accordingly, the output of the first AND gate 64 is asserted if the first state and the second state are different, i.e., a transition has occurred, and the first state and third state are different, i.e., the synchronous clock signal 10 is running late. An asserted output of the first AND gate 64 can therefore be used as a clock advance signal to decrease a delay in the synchronous clock signal 10. The output of the second AND gate 66 is asserted if the first state and the second state are different, i.e., a transition has occurred, and the first state and third state are the same, i.e., the synchronous clock signal 10 signal is running early. An asserted output of the second AND gate 66 can therefore be used as a clock delay signal to increase the delay in the synchronous clock signal 10.

In this illustrative embodiment, the output of the first AND gate 64 is provided as an input to a fourth latch 68. The output of the second AND gate 66 is provided as an input to a fifth latch 70. The output of the fourth latch 68 is provided as an input to a sixth latch 72. The output of the fifth latch 70 is provided as an input to a seventh latch 74. The fourth, fifth, sixth and seventh latches 68, 70, 72, 74 are all clocked by the synchronous clock signal 10 and thereby provide outputs that are timed to assure that XOR gates 60, 62 and AND gates 64, 66 have settled and that the comparisons performed by the XOR gates 60, 62 and AND gates 64, 66 occur before a next offset pulse arrives so that the proper offset clock pulse (item 22, FIGS. 1-3) which occurs between the first and second synchronous clock pulses (items 12 and 15, FIGS. 1-3) is used in the comparison.

The output of the sixth latch 72 is provided as an advance signal, i.e., a decrease delay signal, to controllable delay circuitry 76 in communication with a clock signal 78 which provides the synchronous clock signal 10 and, when asserted, causes the synchronous clock signal 10 to be advanced. The output of the seventh latch 74 is provided as a delay signal to controllable delay circuitry 76 and, when asserted, causes the synchronous clock signal to be delayed.

Figure 7:
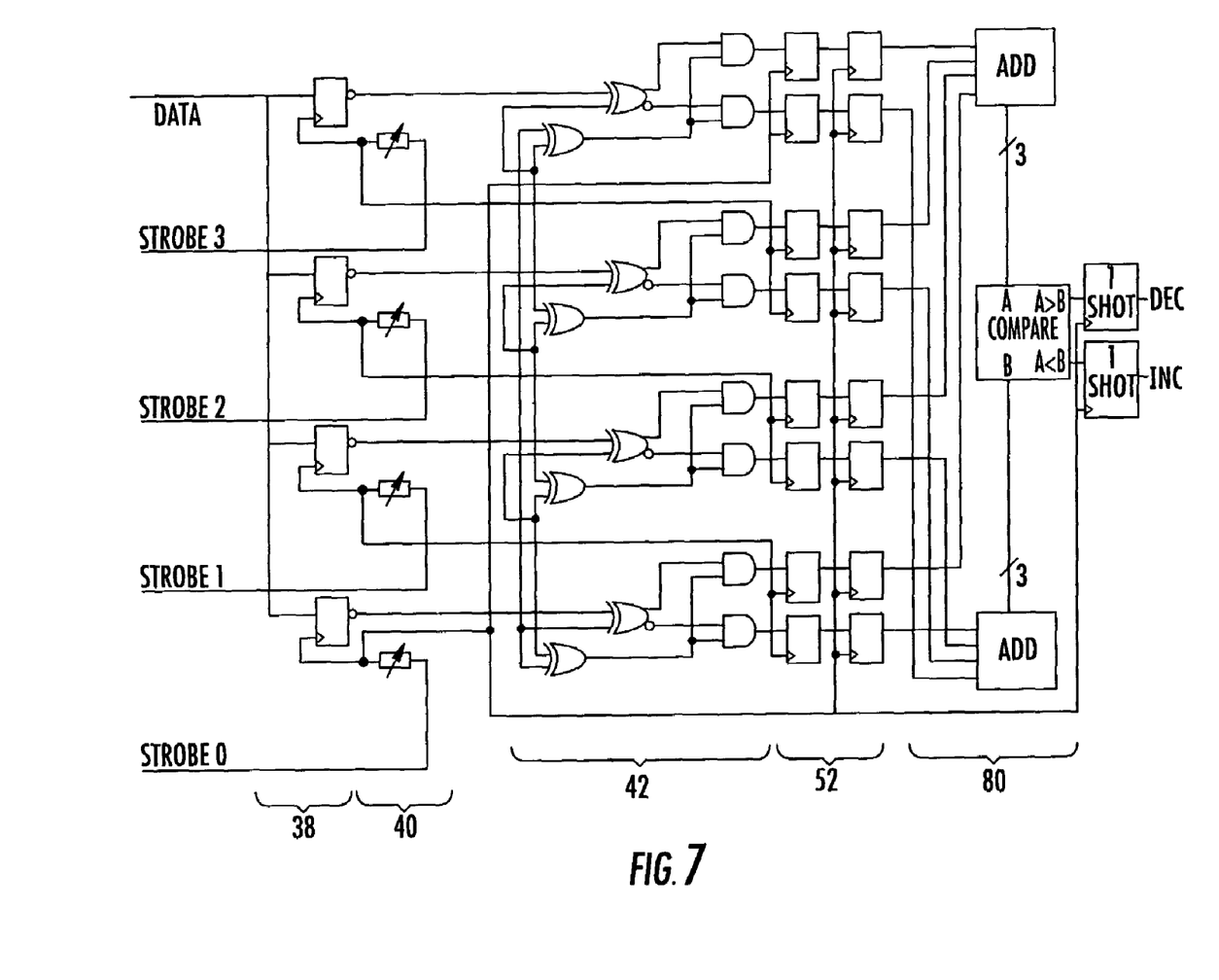
FIG. 7 is a schematic circuit diagram of an apparatus for providing a high speed synchronous clock signal according to an alternative embodiment of the present invention.

Another illustrative embodiment of the invention which provides timing adjustments for a high frequency synchronous clock signal is described with reference to FIG. 7. In this illustrative embodiment, a synchronous clock signal, such as a 2 GHz clock signal is divided, by clock divider circuitry, for example, into a plurality of shifted synchronous clock signals, such as four 8 GHz clock signals, for example. Latching circuitry 38, offset circuitry 40, compare circuitry 42 and delay circuitry 52 are provided for each of the plurality of shifted synchronous clock signals substantially as described herein with reference to FIGS. 5 and 6. In this embodiment, increment and decrement signals are provided by compare circuitry 42 and delay circuitry 52 associated with each of the plurality of synchronous clock signals. The increment and decrement signals are averaged by add and compare circuitries 80 which provide an increment or decrement signal to controllable delay circuitry (not shown) in communication with the 2 GHz clock signal depending on whether the number of increment signals received by the add and compare circuitries 80 were greater than or less than the number of decrement signals received by the add and compare circuitries 80. This embodiment thereby provides a high frequency synchronous clock signal that is self centering with a high frequency data signal.

Although illustrative embodiments of the present invention are described generally in terms of latches, latching circuitry and shift registers, for example, persons having ordinary skill in the art should understand that various other types of circuitry such as, for example, registers, flip flops, memory and the like can be used in place of latches, latching circuitry and/or shift registers without departing from the scope of the present invention.

Although the timing pulses are shown and described generally in FIGS. 1-3 with reference to the center of synchronous clock pulses and the center of offset clock pulses, persons having ordinary skill in the art should understand that various circuitries operate by clocking elements on the rising edge or the falling edge of a clock pulse. It should be understood that the alignment of clock signals and synchronous clock signals can therefore be different from that shown in FIGS. 1-3 to accommodate devices which respond to rising or falling edges of a clock signal within the scope of the present invention.

Although illustrative embodiments of the present invention are described generally in terms of data signals and synchronous clock signals, persons having ordinary skill in the art should understand that data signals comprise various signal types and can include clock signals for example which can be treated as data by test equipment. It should be understood that virtually any type of binary signal associated with a clock signal can be used in place of the data signals described herein without departing from the scope of the present invention.

Although the illustrative embodiments of the present invention are described generally herein in terms of comparing a second state of a data signal at the time of a previous synchronous clock pulse (item 12, FIGS. 1-3) with a third state of the data signal at the time of an offset clock pulse (item 22, FIGS. 1-3) to determine whether to advance or retard the synchronous clock signal, persons having ordinary skill in the art should understand that the first state of the data signal taken at the time of a synchronous clock pulse (item 15, FIGS. 1-3) can also be compared with the third state of the data signal taken at the time of the offset clock pulse (item 22, FIGS. 1-3) to determine whether to retard or advance the synchronous clock signal within the scope of the present invention.

Although the illustrative embodiments of the present invention are described generally in terms of an offset clock signal that is offset by a half data cycle, or a half cycle of the synchronous clock signal, persons having ordinary skill in the art should understand that offset signals which are offset from a synchronous clock signal by different amounts, such as multiples of a data cycle, or fractions of a data cycle can be envisioned for use in detecting whether to advance or retard the synchronous clock signal within the scope of the present invention.

Accordingly, illustrative embodiments of the present invention provide a method and apparatus that can be used to provide a clock signal that is precisely timed relative to a data signal. The methods and apparatus described herein continuously adjust a clock signal relative to an associate data signal so that the clock signal can be used in place of a source-synchronous clock signal in equipment such as electronic test equipment.

It should be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

The invention claimed is :

1. An apparatus for providing a synchronous clock signal comprising:
    latching circuitry receiving a data signal, a synchronous clock signal and an offset synchronous clock signal;
    compare circuitry in communication with the latching circuitry and receiving a latched data state corresponding to a first state, a second latched data state corresponding to a second state and an offset latched data state corresponding to a third state from the latching circuitry; and
    controllable delay circuitry in communication with the compare circuitry wherein the controllable delay circuitry receives the synchronous clock signal and changes a delay in the synchronous clock signal if the latched data state is different from the second latched data state.

2. The apparatus according to claim 1, wherein the controllable delay circuitry is designed to delay or advance a synchronous clock if the first state is different from the second state depending on whether the first state or second state is equal to the third state.

3. The apparatus according to claim 1, further comprising offset circuitry in communication with the latching circuitry, wherein the offset circuitry receives the synchronous clock signal and provides the offset synchronous clock signal to the latching circuitry.

4. The apparatus according to claim 1, wherein the compare circuitry includes a first exclusive-OR-gate in communication with the latching circuitry and receiving the first state and the second state from the latching circuitry.

5. The apparatus according to claim 1, wherein the compare circuitry further comprises a second exclusive-OR-gate in communication with the latching circuitry, wherein the second exclusive-OR-gate receives the first state and the third state from the latching circuitry.

6. The apparatus according to claim 5, wherein the second exclusive-OR-gate comprises a non-inverted output and an inverted output.

7. The apparatus according to claim 6, wherein the compare circuitry further comprises:
    a first AND gate receiving the non-inverted output from the second exclusive-OR-gate and receiving non-inverted output from the first exclusive-OR-gate; and
    a second AND gate receiving the inverted output from the second exclusive-OR-gate and receiving the non-inverted output from the first exclusive-OR-gate.

8. The apparatus according to claim 7, further comprising:
    a fourth latch which is clocked by the synchronous clock signal and receives a signal from the first AND gate;
    a fifth latch which is clocked by the synchronous clock signal and receives a signal from the second AND gate;
    a sixth latch which is clocked by the synchronous clock signal, receives a signal from the fourth latch, and provides a signal to the controllable delay circuitry; and
    a seventh latch which is clocked by the synchronous clock signal, receives a signal from the fifth latch and provides a signal to the controllable delay circuitry.

9. The apparatus according to claim 1, wherein the latching circuitry further comprises:
    a first latch receiving the data signal wherein the first latch is clocked by the synchronous clock signal; and
    a second latch receiving the data signal wherein the second latch is clocked by the offset synchronous clock signal.

10. The apparatus according to claim 9, further comprising a third latch receiving the second state from the first latch wherein the third latch is clocked by the synchronous clock signal.

11. The apparatus according to claim 1, further comprising delay circuitry disposed between the compare circuitry and the controllable delay circuitry.

12. The apparatus according to claim 1, further comprising:
    clock divider circuitry communicating a plurality of synchronous clock signals to the latching circuitry wherein the plurality of synchronous clock signals are time shifted relative to each other;
    a corresponding offset synchronous clock signal in communication with the latching circuitry for each of the plurality of synchronous clock signals, wherein the compare circuitry receives a corresponding first state corresponding to a pulse of each of the plurality of synchronous clock signals, a corresponding third state corresponding to a pulse of each of the plurality of offset synchronous clock signals, and a corresponding second state corresponding to a first state of another of the plurality of synchronous clock signals; and
    averaging circuitry in communication with the compare circuitry and with the controllable delay circuitry, wherein the averaging circuitry averages comparison results for corresponding latched data states and offset latched data states and provides an average comparison to the controllable delay circuitry.

* * * * *